3,117,915
PROCESS FOR PRODUCING L-GLUTAMIC ACID

Isamu Shiio, Tokyo, Koji Mitsugi, Kanagawa-ken, Shinichiro Otsuka, Tokyo, and Toshinao Tsunoda, Kanagawa-ken, Japan, assignors to Ajinomoto Kabushiki Kaisha, Tokyo, Japan, a corporation of Japan
No Drawing. Filed Apr. 7, 1961, Ser. No. 101,364
1 Claim. (Cl. 195—30)

This invention relates to a process for producing L-glutamic acid.

This application is a continuation-in-part of application, Serial No. 37,064, filed June 20, 1960, and now abandoned.

More particularly, the invention contemplates a process for producing L-glutamic acid comprising cultivation of a microorganism such as *Brevibacterium roseum*, *Brevibacterium flavum*, *Brevibacterium lactofermentus* and *Corynebacterium acetoacidophilum* in a medium containing acetic acid or sodium, potassium or ammonium salts thereof as the sole carbon source together with nitrogen source, and inorganic materials, thereby producing and accumulating L-glutamic acid abundantly in the culture medium and isolating said L-glutamic acid.

Heretofore, α-ketoglutaric acid, citric acid, glucose and some others have been used as a carbon source for the production of L-glutamic acid by fermentation process. The numbers of carbon atoms of these compounds used as a carbon source are always 5–6 or more. It is characteristic in the present invention that acetic acid, which is a lower aliphatic acid having only two carbon atoms and can be readily, economically and industrially produced by chemical synthesis or salts thereof, is used as a carbon source in place of the expensive compounds or natural products as mentioned above.

In the present invention, L-glutamic acid having 5 carbon atoms is synthesized biochemically from acetic acid or salts thereof having only two carbon atoms contrary to the process as used heretofore in which a compound having many carbon atoms is converted to L-glutamic acid. Thus, the present invention is very interesting biochemically and provides a very advantageous industrial process.

For the culture medium in which L-glutamic acid is produced and accumulated according to the process of the present invention, salts of acetic acid, such as potassium acetate and sodium acetate, or acetic acid may be advantageously used as carbon source, and urea, ammonia or ammonium salts, such as ammonium chloride, ammonium sulfate, and ammonium carbonate may be used as nitrogen source. However, ammonium acetate maye be used as a material which serves as carbon source and nitrogen source simultaneously.

In addition to the carbon source and the nitrogen source, proper quantities of minerals, and vitamins or vitamin containing materials and other growth factors may be added for the completion of the medium. As examples of such materials, vitamin $B_1$, biotin, yeast extract, corn steep liquor, soybean meal hydrolysate, fish meal, digested fish meal and casein hydrolysate may be mentioned.

In the process of the present invention, cultivation is conducted in a medium as described above after adjusting pH to 7.0–9.0, at 28–33° C. for 2–4 days under shaking or under stirring and aeration in submerged condition. When ammonium acetate is used as both carbon and nitrogen source, it is necessary to use acetic acid or salts thereof other than ammonium acetate together therewith in order to maintain the ratio of carbon to nitrogen within a predetermined range. When pH becomes higher than 9.0, it may be lowered by adding acetic acid and when pH becomes lower than 7.0, it may be raised by adding ammonia or urea. The production of L-glutamic acid is carried out actively when pH is maintained within the range of 7.5–8.5. When the fermentation is completed, the broth is sterilized by heating, concentrated after removing cells and L-glutamic acid is recovered therefrom by any conventional method, for example, by crystallization at the isoelectric point of glutamic acid or utilizing ion exchange resin.

The four species (*Brevibacterium roseum* ATCC No. 13825, *Brevibacterium flavum* ATCC No. 13826, *Brevibacterium lactofermentus* ATCC No. 13869, and *Corynebacterium acetoacidophilum* ATCC No. 13870) used in the following examples of the process of the present invention have bacteriological characteristics as shown in Table 1 and no microorganism which can be identified to be the same with any of these four species is found in Bergey's Manual of Determinative Bacteriology, 7th edition. It is, therefore, considered that the four species belong to new species.

The bacteriological characteristics of these four species are as follows:

TABLE 1
Bacteriological Characteristics of 4 Species

| | Brevibacterium roseum (ATCC No. 13825 [1]) | Brevibacterium flavum (ATCC No. 13826 [1]) | Brevibacterium lactofermentus (ATCC No. 13869 [2]) | Corynebacterium acetoacidophilum (ATCC No. 13870 [2]) |
|---|---|---|---|---|
| 1. Form of cells | Short rods, usually single or two, $0.5 \times 0.6$–$2.0\mu$ | Short rods, usually single or two, $0.5 \times 0.6$–$2.0\mu$ | Short rods, usually single or two, $0.5 \times 0.9$–$1.4\mu$ | Short rods, usually single or two, many variations in the forms, $0.5 \times 0.6$–$2.0\mu$ |
| 2. Mobility | None | None | None | None. |
| 3. Spore formation | do | do | do | Do. |
| 4. Gram stain | Positive | Positive | Positive | Positive. |
| 5. Agar colonies | Circular, smooth, fairly dry, entire in the edge. | Circular, smooth, dry, entire in the edge. | Circular, smooth, fairly wet, entire in the edge, small. | Circular, smooth, dry, entire in the edge. |
| 6. Agar slant | Linear, butyrous, dryish surface, dull luster rosy, no change of color of the medium. | Linear, butyrous, growth normal, dryish surface, dull luster, yellow. | Linear, butyrous, active growth, generally opaque, yellow. | Linear butyrous, active growth, dryish surface, dull luster, yellow. |
| 7. Chromogenesis | Cells grown in bouillon also exhibit rosy color. Distinct in synthetic medium (sugar, urea, yeast, extract, C.S. 1, agar etc.). | Cells grown in bouillon also exhibit yellow color. Distinct in synthetic medium (sugar, urea, yeast, extract, C.S. 1, agar etc.). | Cells grown in bouillon also exhibit pale yellow color. | Cells grown in bouillon also exhibit yellow color. Distinct in synthetic medium (sugar, urea, yeast, extract, C.S. 1, agar etc.). |
| 8. Agar stab | Growth on the surface and along stub, no growth in the submerged part; aerobic. | Growth on the surface and along stab, no growth in the submerged part, aerobic. | Slight growth along stub, growth on the surface particularly good, aerobic. | Growth along stab but no growth in the submerged part, aerobic. |
| 9. Nutrient | No growth on the surface, almost clear, cells are hard deposit and suspend in liquid taking wooly form under shaking. | No growth on the surface, almost clear, cells are hard deposit and suspend in liquid taking wooly form under shaking. | No growth on the surface, slightly turbid, little deposit. | No growth on the surface, almost clear, cells are hard deposit and suspend in liquid taking wooly form under shaking. |

See footnotes at end of table.

TABLE 1—Continued

| | *Brevibacterium roseum* (ATCC No. 13825 [1]) | *Brevibacterium flavum* (ATCC No. 13826 [1]) | *Brevibacterium lactofermentus* (ATCC No. 13869 [2]) | *Corynebacterium acetoacidophilum* (ATCC No. 13870 [2]) |
|---|---|---|---|---|
| 10. Growth temperature, °C. | 20°C, 30°C, 37°C, 42°C +++ +++ +++ ± | 20°C, 30°C, 37°C, 42°C +++ +++ +++ ± | 20°C, 30°C, 37°C, 40°C +++ +++ +++ ± | 20°C, 30°C, 37°C, 42°C. +++ +++ +++ ± |
| 11. pH for growth | 5.0, 6.0, 7.0, 8.0, 9.0 ± + + + ± | 5.0, 6.0, 7.0, 8.0, 9.0 ± + + + ± | 5.0, 6.0, 7.0, 8.0, 9.0 ± + + + + | 5.0, 6.0, 7.0, 8.0, 9.0. ± + + + ± |
| 12. Gelatin liquefaction. | None | None | None | None. |
| 13. Litmus milk | Not decolorized, only slightly change to alkali. | Not decolorized, only slightly change to alkali. | In a day, acidification coagulation and reduced decolorization of litmus take place. | Not decolorized, only slightly change to alkali. |
| 14. Indole production. | None | None | None | None. |
| 15. H₂S production. | Substantially none | Substantially none | Blackened very slightly, but considered negative. | Substantially none. |
| 16. Nitrate reduction. | Positive | Positive | Exhibits pale rosy color, positive. | Negative. |
| 17. Hydrolysis of starch. | Negative | Negative | Negative | Do. |
| 18. Methyl red test | do | do | Distinctly positive | Do. |
| 19. Voges-Proskauer reaction. | do | do | do | Do. |
| 20. NH₃ production. | Positive | Positive | Positive | Positive. |
| 21. Catalase | do | do | do | Do. |
| 22. Urease | do | do | do | Do. |
| 23. Usability of NH₄H₂PO₄. | No growth, no growth even with addition of biotin. | No growth, no growth even with addition of biotin. | No growth | No growth. |
| 24. Relation to free oxygen. | Facultatively anaerobic | Facultatively anaerobic | Facultatively anaerobic | Facultatively anaerobic. |
| 25. Sugar fermentation:[3] | | | | |
| Glucose | A[4] | A | A | A |
| Fructose | A | A | A | A |
| Galactose | −[5] | − | A | − |
| Mannose | − | A | A | A |
| Lactose | − | − | A | − |
| Sucrose | A | A | A | A |
| Maltose | A | A | A | A |
| Trehalose | − | − | A | A |
| Mannitol | − | − | A | − |
| Sorbitol | − | − | − | − |
| Erythritol | − | − | − | − |
| Xylose | − | − | A | − |
| Arabinose | − | − | A | − |
| Melecitose | − | − | − | − |
| Rhamnose | − | − | − | − |
| Raffinose | − | − | A | − |
| Glycerol | − | − | − | − |
| Starch | − | − | − | − |
| Dextrine | − | − | A | − |
| Inuline | − | − | − | − |
| Glycogen | − | − | − | − |
| Melibiose | − | G[6] | A | − |
| Cellobiose | − | − | A | − |
| Esculin | − | − | − | − |
| α-methyl-glucoside. | − | − | − | − |

[1] ATCC No. 13825 and 13826 were assigned by American Type Culture Collection on June 10, 1960.
[2] ATCC No. 13869 and 13870 were assigned by American Type Culture Collection on July 7, 1960.
[3] Composition of medium, sugar 0.2–0.5%, peptone 1.0%, NaCl 0.5%, BCP culture at 30° C. for seven days (5.0 ml. portions are introduced in each of test tubes Durham tube injected).
[4] A: Acid produced.
[5] −: No production.
[6] G: Gas produced.

Examples of the process of the present invention are described in detail as follows:

EXAMPLE 1

A medium of the following composition was prepared.

Ammonium acetate _____ 2.57% (2% as acetic acid).
Sodium acetate _____ 4.53% (2% as acetic acid).
KH₂PO₄ _____ 0.2%.
MgSO₄·7H₂O _____ 0.04%.
Vitamin B₁ _____ 10 μg/dl.
Corn-steep liquor _____ 0.2%.
Fe⁺⁺ _____ 2 p.p.m.
Mn⁺⁺ _____ 2 p.p.m.
Soybean meal hydrolysate__ 0.1 ml/dl.
(Total nitrogen 2.4%)

After adjusting pH to 7.5–8.0, the medium was introduced in several flasks of 500 ml. capacity as portions of 50 ml. respectively, and all portions were sterilized by heating at 115° C. for 10 minutes. *Brevibacterium flavum* ATCC No. 13826 cultured for 24 hours at 30° C. was inoculated to the medium in the flask and cultured under shaking at 30° C. The microorganism began to grow after about 24 hours from the start of culture and pH gradually rose. Every time when pH became 9.0 or higher, it was adjusted by adding 50% solution of acetic acid to maintain the pH in value 7.5–8.5. The fermentation was completed in about 3 days. The consumption of acetic acid was 98% and produced L-glutamic acid amounted to 15 g./l. (yield 30% on the basis of acetic acid). After the completion of fermentation, the broth was sterilized by heating and, after removing cells, was concentrated to obtain a concentrated solution of L-glutamic acid and then L-glutamic acid was recovered therefrom by crystallization at the isoelectric point of glutamic acid.

EXAMPLE 2

A medium of the following composition was prepared.

Ammonium acetate _____ 2.57% (2.0% as acetic acid).
Sodium acetate _____ 4.53% (2.0% as acetic acid).
KH₂PO₄ _____ 0.2%.
MgSO₄·7H₂O _____ 0.04%.
Vitamin B₁ _____ 10 μg/dl.
Corn steep liquor _____ 0.3%.
Soybean meal hydrolysate_____ 0.1 ml./dl.
(Total nitrogen 2.4%.)
Fe⁺⁺ and Mn⁺⁺ _____ 2 p.p.m. respectively.

After adjusting the pH of the medium and sterilizing as in Example 1, separate portions of the medium were inoculated respectively with the following three strains and cultured at 30° C. for 3 days under shaking. During the cultivation, 50% solution of acetic acid was added from time to time for the adjustment of pH, and the total of such added solution of acetic acid in each portion was 2.0 ml.

L-glutamic acid produced was recovered from the broth after completion of fermentation according to conventional process as in Example 1.

The amounts of L-glutamic acid produced by three strains were shown in the following table:

| Strain used | Amount of produced L-glutamic acid, g/l. | Yield on the basis of acetic acid, percent |
| --- | --- | --- |
| Brevibacterium roseum ATTC No. 13825 | 14.8 | 24.8 |
| Brevibacteriumlactofermentus ATCC No. 13869 | 14.3 | 24.0 |
| Corynebacterium acetoacidophilum ATCC No. 13670 | 7.3 | 11.3 |

EXAMPLE 3

A medium of the following composition was prepared.

Ammonium acetate_____ 2,57% (2.0% as acetic acid).
Potassium acetate_____ 3.27% (2.0% as acetic acid).
$KH_2PO_4$_____ 0.2%.
$MgSO_4 \cdot 7H_2O$_____ 0.04%.
Vitamin $B_1$_____ 10 μg./dl.
Corn-steep liquor_____ 0.3%.
$Mn^{++}$, $Fe^{++}$_____ 2 p.p.m. respectively.
pH=7.8

After preparing the medium and sterilizing as Example 1, *Brevibacterium flavum* ATCC No. 13826 was inoculated to the above medium and cultured at 28° C. to 33° C. for 95 hours under shaking. The pH of the medium was adjusted between 7.0 and 9.0 during the cultivation, described as in Example 1. The amount of acetate (initial acetate and added acetate for pH adjustment) was 4.9% as acetic acid and 96% of acetate was consumed.

L-glutamic acid produced amounted to 13 g./l. (yield 26.6% on the basis of acetic acid).

What we claim is:

Process for producing L-glutamic acid characterized by culturing under aerobic condition a microorganism selected from the group consisting of L-glutamic acid producing strains of *Brevibacterium roseum*, *Brevibacterium flavum*, *Brevibacterium lactofermentus* and *Corynebacterium acetoacidophilum* in a medium containing at least one compound selected from the group consisting of acetic acid and sodium, potassium and ammonium salts thereof as the carbon source at pH from 7.0 to 9.0.

References Cited in the file of this patent

UNITED STATES PATENTS 3,003,925    Kinoshita et al. _____ Oct. 10, 1961

OTHER REFERENCES

Tomlinson, Journal of Biological Chemistry vol. 209 (1954) pp. 585–609).